(12) United States Patent
Kim

(10) Patent No.: US 12,105,368 B2
(45) Date of Patent: Oct. 1, 2024

(54) CURVED DISPLAY DEVICE MANUFACTURING METHOD

(71) Applicant: LG ELECTRONICS INC., Seoul (KR)

(72) Inventor: Daehong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 271 days.

(21) Appl. No.: 17/630,494

(22) PCT Filed: Jul. 29, 2019

(86) PCT No.: PCT/KR2019/009446
§ 371 (c)(1),
(2) Date: Jan. 26, 2022

(87) PCT Pub. No.: WO2021/020613
PCT Pub. Date: Feb. 4, 2021

(65) Prior Publication Data
US 2022/0317505 A1    Oct. 6, 2022

(51) Int. Cl.
*B32B 37/12*    (2006.01)
*B32B 7/14*    (2006.01)
(Continued)

(52) U.S. Cl.
CPC .......... *G02F 1/133325* (2021.01); *B32B 7/14* (2013.01); *B32B 17/06* (2013.01);
(Continued)

(58) Field of Classification Search
CPC ......... G02F 1/133325; G02F 1/133305; G02F 1/133331; B32B 7/14; B32B 14/06; B32B 38/0012; B32B 38/1858
See application file for complete search history.

(56) References Cited

U.S. PATENT DOCUMENTS

2004/0089415 A1* 5/2004 Byun .................. B32B 38/1858
156/287
2008/0099128 A1 5/2008 Yamada et al.
(Continued)

FOREIGN PATENT DOCUMENTS

KR    20070113615    11/2007
KR    2015013987 A  *  2/2015
(Continued)

OTHER PUBLICATIONS

Korean Intellectual Property Office Application Serial No. 10-2021-7040682, Office Action dated Jul. 24, 2023, 4 pages.
(Continued)

*Primary Examiner* — Daniel McNally
(74) *Attorney, Agent, or Firm* — LEE, HONG, DEGERMAN, KANG & WAIMEY

(57) ABSTRACT

The present invention provides a curved display device manufacturing method comprising the steps of: coupling a flat display, a transparent adhesive layer, and flat cover glass, thereby manufacturing a flat display assembly; applying an adhesive to the edge of the flat display assembly; seating the flat display assembly on a curved jig; adsorbing the flat display assembly onto the surface of the curved jig by using vacuum holes formed in the curved jig such that the flat display assembly is bent; and coupling a backlight unit to the adhesive-applied area. The step of coupling a backlight unit to the adhesive-applied area comprises a step of curing the adhesive in a state in which the backlight unit is forced against the display assembly such that the display assembly remains bent.

8 Claims, 12 Drawing Sheets

(51) Int. Cl.
*B32B 17/06* (2006.01)
*B32B 38/00* (2006.01)
*B32B 38/18* (2006.01)
*G02F 1/1333* (2006.01)

(52) U.S. Cl.
CPC ...... *B32B 37/1292* (2013.01); *B32B 38/0012* (2013.01); *B32B 38/1858* (2013.01); *G02F 1/133305* (2013.01); *G02F 1/133331* (2021.01); *B32B 2457/202* (2013.01); *B32B 2605/003* (2013.01); *G02F 1/133314* (2021.01); *G02F 2201/56* (2013.01); *G02F 2202/28* (2013.01)

(56) References Cited

U.S. PATENT DOCUMENTS

| | | |
|---|---|---|
| 2014/0002973 A1 | 1/2014 | Lee et al. |
| 2017/0042046 A1 | 2/2017 | Lee et al. |
| 2017/0255033 A1 | 9/2017 | Kim et al. |
| 2019/0077262 A1* | 3/2019 | Benjamin ........... B32B 38/0012 |

FOREIGN PATENT DOCUMENTS

| | | |
|---|---|---|
| KR | 20150013987 | 2/2015 |
| KR | 101927801 | 2/2019 |
| KR | 20190053642 | 5/2019 |

OTHER PUBLICATIONS

State Intellectual Property Office of the People's Republic of China Application Serial No. 201980099021.4, Office Action dated May 26, 2023, 9 pages.
European Patent Office Application Serial No. 19940082.1, Search Report dated Mar. 15, 2023, 8 pages.
PCT International Application No. PCT/KR2019/009446, International Search Report dated Apr. 27, 2020, 4 pages.

* cited by examiner

CURVED DISPLAY DEVICE MANUFACTURING METHOD

CROSS-REFERENCE TO RELATED APPLICATIONS

This application is the National Stage filing under 35 U.S.C. 371 of International Application No. PCT/KR2019/009446, filed on Jul. 29, 2019, the contents of which are all incorporated by reference herein in its entirety.

TECHNICAL FIELD

The present disclosure relates to a method of processing a flat display and a flat cover glass to manufacture a curved display device.

BACKGROUND ART

As a demand for high-resolution and high-visibility displays increases in the fields of automobiles, mobile devices, TVs, and the like, in recent years, display devices having excellent characteristics such as thinness and flexibility have been developed in the field of display technology. In particular, a curved display device for increasing the visibility of a display has been actively developed.

On the other hand, the display device is provided with a display for displaying screen information and a cover glass for protecting the display. In order to manufacture a curved display device, a curved cover glass must be provided therein. The curved cover glass must be processed to have the same curvature as that of the curved display.

In the related art, the curved display device has been manufactured by a method of bonding a light-transmitting adhesive layer to a flexible display and then bonding it to a curved cover glass. In this method, since curved lamination must be performed, there is a problem in that a process difficulty is increased, and a curved lamination process must be redesigned when there is a variation in a curved surface of the display device.

DISCLOSURE OF INVENTION

Technical Problem

Therefore, to obviate those problems, an aspect of the detailed description is to provide a manufacturing method capable of easily bonding a curved display and a curved cover glass during the manufacture of the curved display.

Solution to Problem

To achieve these and other advantages and in accordance with the purpose of the present invention, as embodied and broadly described herein, there is provided a method of manufacturing a curved display device, including coupling a flat display, an optical clear adhesive, and a cover glass to manufacture a flat display assembly, applying an adhesive to an edge of the flat display assembly, seating the flat display assembly on a curved jig, sucking the flat display assembly to a surface of the curved jig using a vacuum hole disposed in the curved jig such that the flat display assembly is bent, and coupling a backlight unit to a region to which the adhesive is applied, wherein the coupling of a backlight unit to a region to which the adhesive is applied comprises curing the adhesive while the backlight unit is pressed to the display assembly so as to maintain a bent state of the display assembly.

According to an embodiment, the curved jig may be provided with a plurality of vacuum holes, and the sucking of the flat display assembly to a surface of the curved jig may be performed by depressurizing an inside of the vacuum holes.

According to an embodiment, the seating of the flat display assembly on a curved jig may be performed by a first lift pin coming into contact with a central portion of the flat display assembly and a second lift pin coming into contact with an edge portion of the flat display assembly.

According to an embodiment, each of the first and second lift pins may include a vacuum suction pad that is vacuum-sucked to the display assembly.

According to an embodiment, the seating of the flat display assembly on a curved jig may include seating the flat display assembly on first and second lift pins, moving the first and second lift pins to the curved jig such that the flat display assembly and the curved jig overlap each other, and descending the first and second lift pins to seat the flat display assembly on the curved jig.

According to an embodiment, the descending of the first and second lift pins to seat the flat display assembly on the curved jig may be performed by descending the first and second lift pins until the flat display assembly comes into contact with an uppermost portion of the curved jig, and the sucking of the flat display assembly to a surface of the curved jig may be performed by descending the second lift pin.

According to an embodiment, the sucking of the flat display assembly to a surface of the curved jig may be performed while maintaining a suction force of the vacuum suction pad provided in the second lift pin.

According to an embodiment, the coupling of a backlight unit to a region to which the adhesive is applied may include fixing the display assembly and the backlight unit with a clamp so as to maintain the display assembly in a bent state.

According to an embodiment, the method may further include fixing the display assembly with a clamp to maintain the display assembly in a bent state after sucking the flat display assembly to a surface of the curved jig.

According to an embodiment, the coupling of a flat display, an optical clear adhesive, and a cover glass to manufacture a flat display assembly may be performed by roll lamination.

Advantageous Effects of Invention

In accordance with the detailed description, a roll lamination process may be performed when a display and a cover glass are in a flat state, and thereby it is not required to design a lamination process for a curved surface. Further, according to the present disclosure, a curved surface of a curved jig may be changed according to a curvature of a display assembly to be implemented, thereby maximizing the productivity and profitability of a curved display.

MODE FOR THE INVENTION

Figure 1:
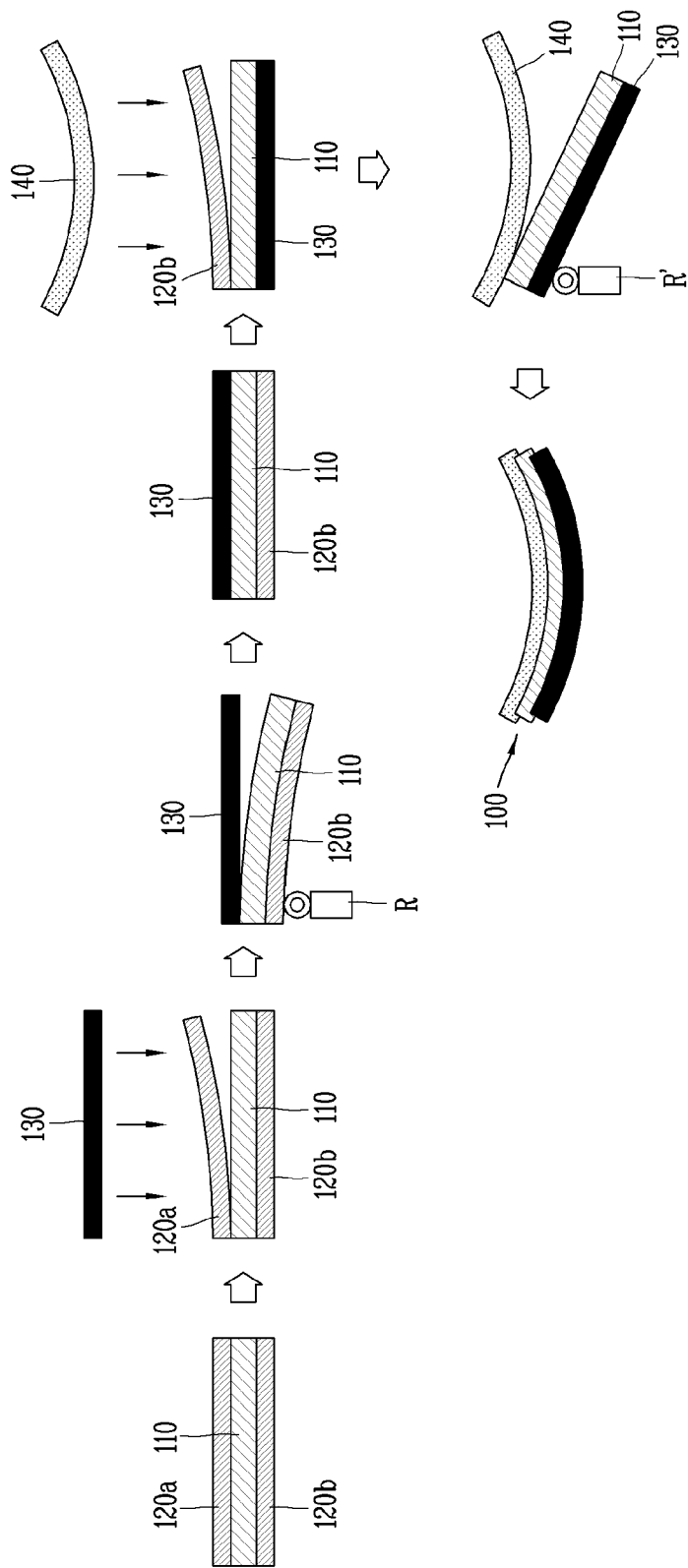
FIG. 1 is a flowchart showing a method of bonding a curved cover glass to a display in the related art.

Hereinafter, an embodiment disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing an embodiment disclosed herein, moreover, the detailed description will be omitted when specific description for publicly known technologies to which the invention pertains is judged to obscure the gist of the present disclosure. Furthermore, it should be noted that the accompanying drawings are merely illustrated to easily explain the concept of the invention, and therefore, they should not be construed to limit the technological concept disclosed herein by the accompanying drawings.

Moreover, it will be understood that when an element such as a layer, region or substrate is referred to as being "on" another element, it can be directly on the other element or an intermediate element may also be interposed therebetween.

Prior to describing a manufacturing method according to the present disclosure, a method of bonding a curved cover glass to a display in the related art will be described.

Figure 2:
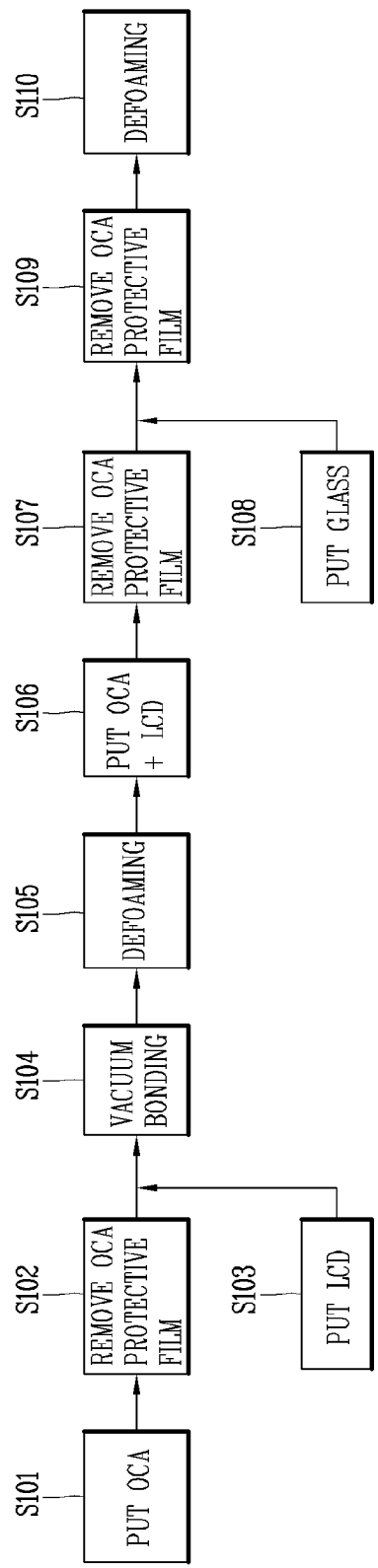
FIG. 2 is a conceptual view showing a method of bonding a curved cover glass to a display in the related art.
Figure 3:
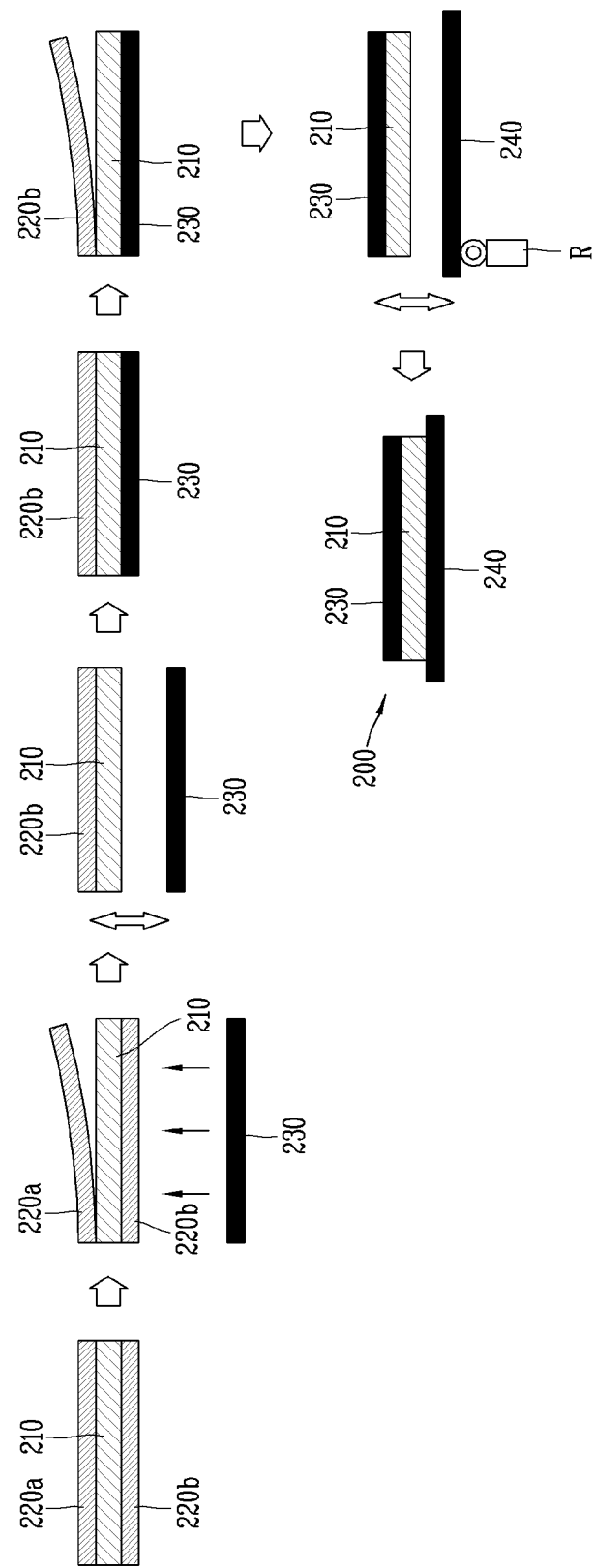
FIGS. 3 to 6 are conceptual views showing a method of manufacturing a curved display device according to the present disclosure.

FIG. 1 is a flowchart showing a method of bonding a curved cover glass to a display in the related art, and FIG. 2 is a conceptual view showing a method of bonding a curved cover glass to a display in the related art.

Referring to the drawings, first, removing a protective film 120a from one surface of an optical clear adhesive (OCA) 110 both surfaces of which are covered with protective films 120a and 120b, and pressing a flat display 130 against the optical clear adhesive 110 (S101 to S104) is carried out.

At this time, pressing between the optical clear adhesive 110 and the flat display 130 may be performed by a roll lamination method (R), but is not limited thereto.

Then, removing air bubbles formed between the optical clear adhesive 110 and the flat display 130 (S105) is performed. Here, the removing of the air bubbles may be carried out by atmospheric defoaming (auto clave).

Then, removing the protective film 120b from one surface of the optical clear adhesive 110 and attaching the optical clear adhesive 110 to a curved cover glass 140 is carried out. At this time, the optical clear adhesive 110 to which the display 130 is attached is bonded to the cover glass 140 through roll lamination (R). In this process, the flat display 130 is bent.

Then, removing air bubbles formed between the optical clear adhesive 110 and the cover glass 140 (S110) is carried out. Here, the removing of the air bubbles (S110) may be carried out atmospheric defoaming (auto clave). In the present specification, a state in which the cover glass 140, the optical clear adhesive 110, and the display 130 are bonded will be referred to as a display assembly 100.

Subsequent to the completion of the display assembly 100, assembling a back cover to the display assembly is carried out. When the display included in the display assembly is an LCD display, assembling a backlight unit is carried out prior to the assembly of the back cover.

Meanwhile, a separate adhesive may be used to prevent separation between the back cover and the display assembly when assembling the display assembly and the back cover.

The foregoing method in the related art has a problem in that it is difficult to implement a facility for a curved surface because roll lamination must be performed on the curved cover glass. In addition, there are disadvantages in that it is difficult to manufacture the curved cover glass and the price is very high compared to a flat cover glass. The present disclosure provides a manufacturing method for implementing a curved display device using a flat cover glass and a flat display.

Specifically, the present disclosure provides a manufacturing method capable of implementing a curved display while using an existing roll lamination facility for bonding a flat cover glass and a flat display as it is.

FIGS. 3 to 6 are conceptual views showing a method of manufacturing a curved display device according to the present disclosure.

Referring to the drawings, first, removing a protective film 220a from one surface of an optical clear adhesive (OCA) 210 both surfaces of which are covered with protective films 220a and 220b, and pressing a flat display 230 against the optical clear adhesive 210 is carried out.

Here, the optical clear adhesive 210 may be a silicone-based or acrylic-based optical clear adhesive 210, but is not limited thereto.

In this case, pressing between the optical clear adhesive 210 and the flat display 230 is performed in a roll lamination method. The bonding process may be performed inside a vacuum chamber. A pressure inside the chamber may be 10 to 1000 Pa.

An inside of the vacuum chamber includes an adhesive chuck or an electro static chuck (ESC) capable of sucking the optical clear adhesive 210 and the display 230, and is provided with a robot or transfer device for putting and taking the display 230 therein and therefrom. Further, the vacuum chamber is disposed with upper/lower adhesive chucks thereinside, and configured with suction lift pins for transferring the optical clear adhesive 210 and the display 230, and separate vacuum suction holes to fix the optical clear adhesive 210 and the display 230 to the adhesive chucks. In addition, a plurality of optical devices for precisely aligning the optical clear adhesive 210 and the display 230 may be disposed inside the vacuum chamber.

Meanwhile, immediately after the optical clear adhesive 210 and the display 230 are put into the vacuum chamber, depressurization inside the vacuum chamber may not be completed. In the present disclosure, an alignment between the optical clear adhesive 210 and the display 230 and depressurization inside the chamber are simultaneously performed.

Accordingly, an alignment between the optical clear adhesive 210 and the display 230 may be performed at pressures of 100 to 1000 Pa, and a bonding process between the optical clear adhesive 210 and the display 230 may be performed in a vacuum atmosphere of 10 to 500 Pa.

Next, removing air bubbles formed between the optical clear adhesive 210 and the flat display 230 is carried out.

Here, the removing of the air bubbles may be carried out by atmospheric defoaming (auto clave).

In one embodiment, the defoaming condition may be performed at pressures of 3 to 15 kg/cm$^2$, at temperatures of 24 to 80° C. for 4 to 15 minutes.

Next, removing the protective film 220b from one surface of the optical clear adhesive 210 and attaching the optical cover glass 210 to the flat cover glass 240 is performed. At this time, the optical clear adhesive 210 to which the display 230 is attached is bonded to the cover glass 240 through roll lamination (R). This process is performed inside the foregoing vacuum chamber.

An alignment between the optical clear adhesive 210 and the cover glass 240 is performed at pressures of 100 to 1000 Pa, and a bonding process between the optical clear adhesive 210 and the cover glass 240 may be performed in a vacuum atmosphere of 10 to 500 Pa.

Next, removing air bubbles formed between the optical clear adhesive 210 and the flat display 230 is carried out. Here, the removing of the air bubbles may be carried out by atmospheric defoaming (auto clave).

In one embodiment, the defoaming condition may be performed at pressures of 3 to 15 kg/cm$^2$, at temperatures of 24 to 80° C. for 4 to 15 minutes.

Then, since the flat cover glass 240 is bent at an outer side of the display 230 in the process, an area of the flat cover glass 240 must be larger than that of the display 230. When the defoaming step is finished, the display assembly 200 is completed.

Hereinafter, a process of assembling a backlight unit and a back cover to the display assembly 200 will be described.

Figure 4:
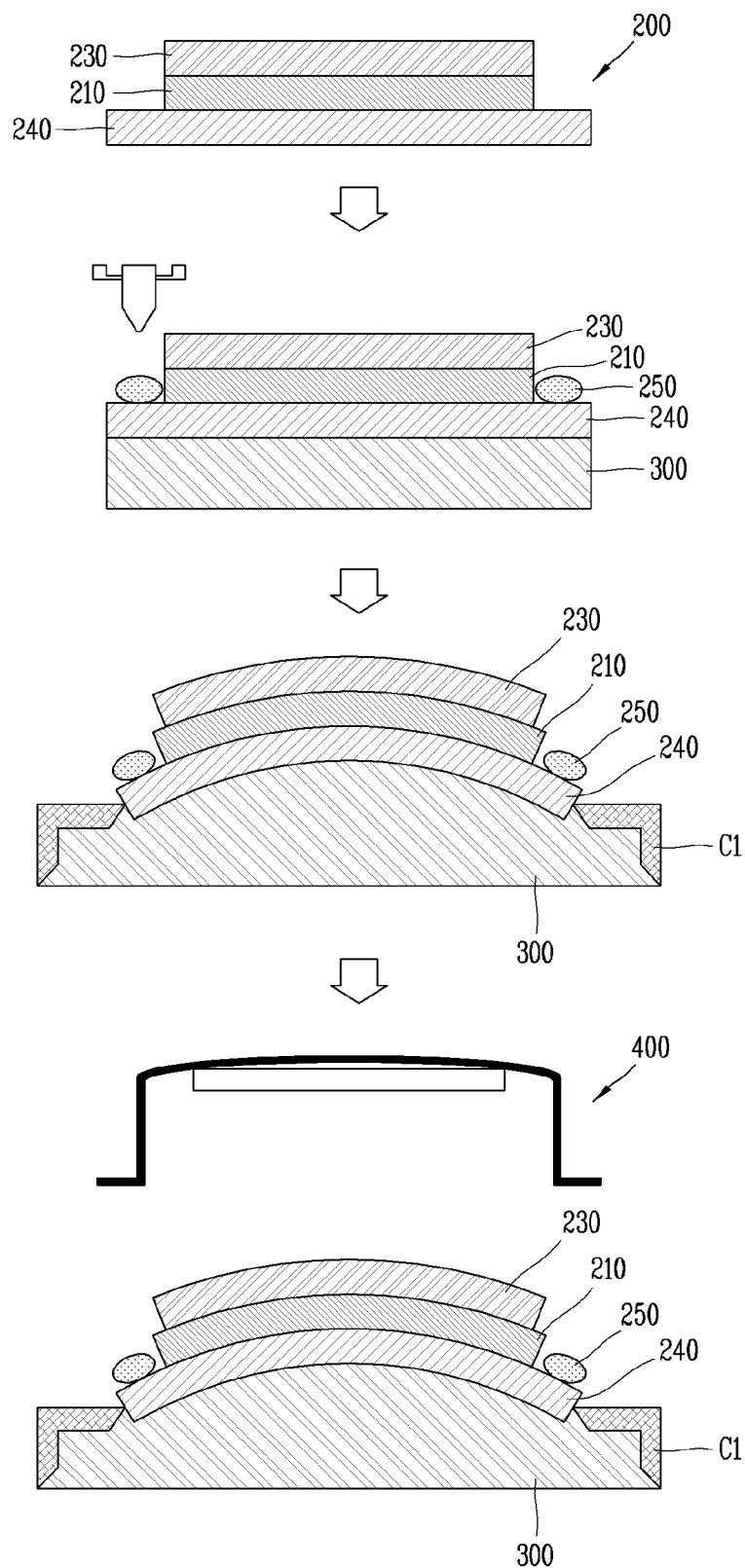
Figure 5:
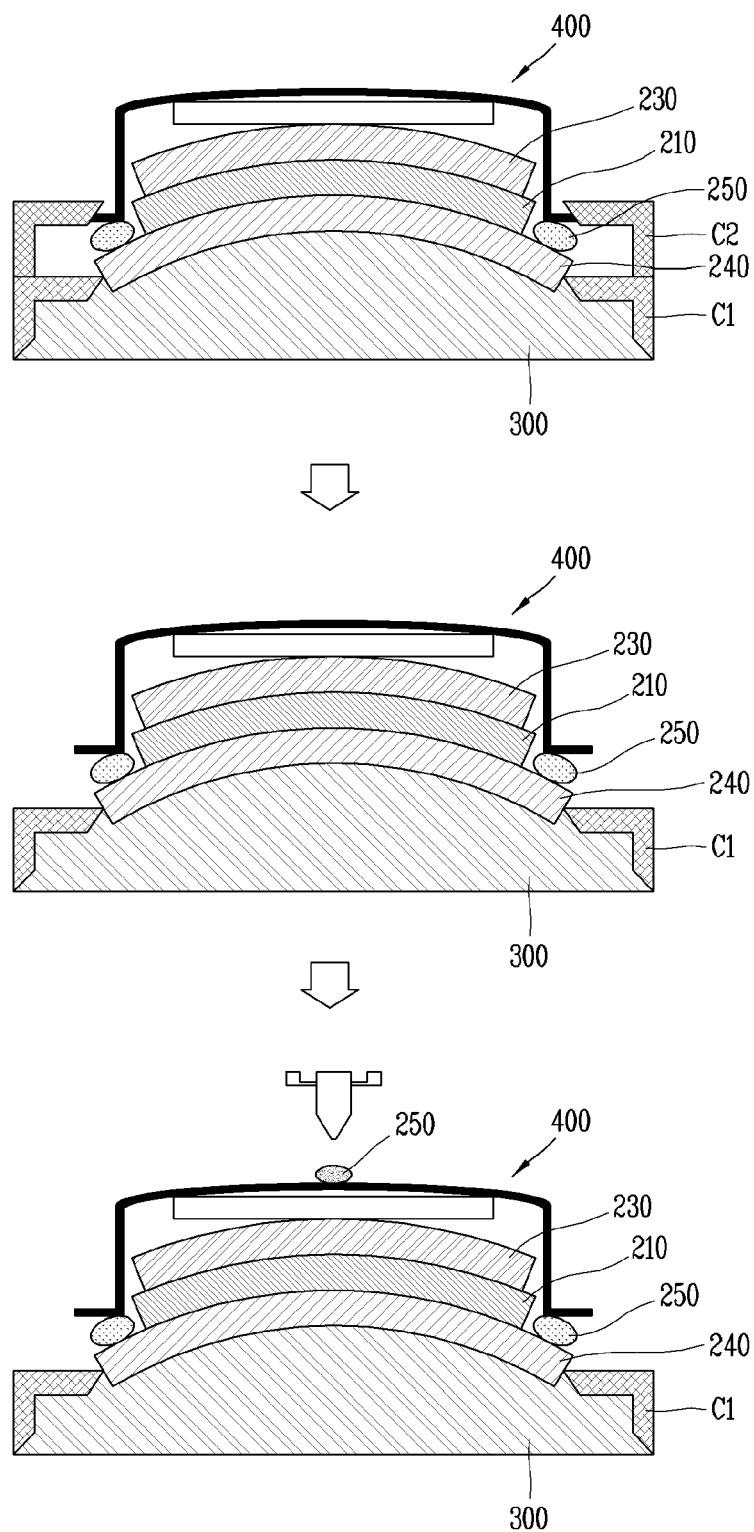
Figure 6:
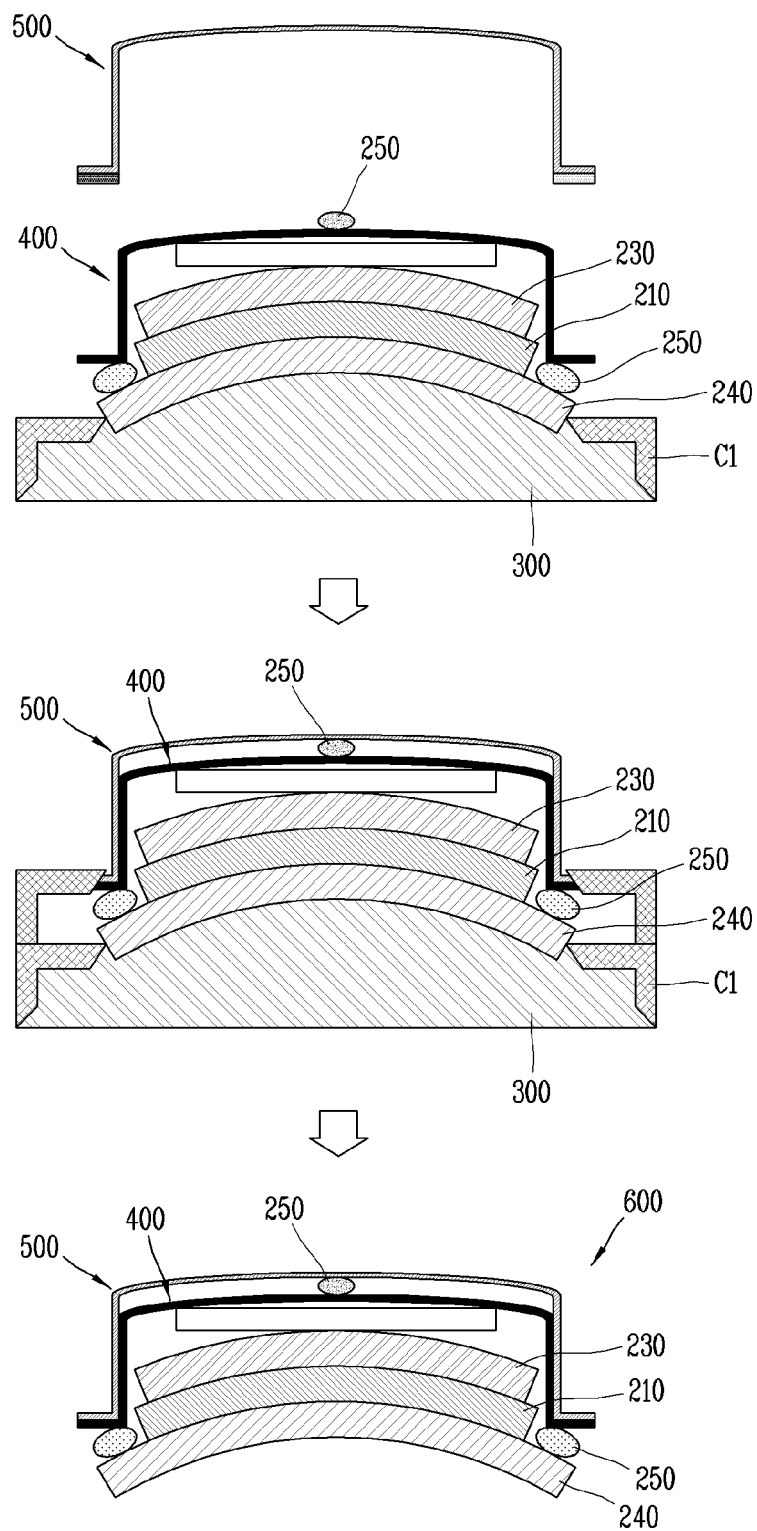

Referring to FIG. 4, applying an adhesive 250 to an edge of the display assembly 200 is carried out. Here, the edge denotes an edge of the flat cover glass 240 that does not overlap the display 230.

The adhesive 250 may be an acrylic-based, silicone-based, or urethane-based adhesive, but is not limited thereto. The adhesive may also be an adhesive in the form of a film. Meanwhile, a curing method of the adhesive may be UV curing, thermal curing, or natural curing. The curing method of the adhesive may vary depending on the type of the adhesive.

Then, applying an external force to bend the display assembly 200 is performed. The bending of the display assembly 200 will be described in detail later.

Meanwhile, in order to assist a physical force for bending the display assembly 200, a first clamp C1 may be disposed at an edge of the display assembly 200. However, the first clamp C1 is not essentially required.

Then, a part of the backlight unit 400 is brought into contact with a position where the adhesive 250 is applied, and the adhesive 250 is cured. In this case, a second clamp C2 may be provided at an edge of the backlight unit 400 such that the display assembly 200 and the backlight unit 400 are strongly coupled to each other. The adhesive 250 is cured while the second clamp C2 is provided.

Then, applying the adhesive 250 to the backlight unit 400 is carried out. Here, since the adhesive 250 is used for the purpose of coupling the backlight unit 400 and the back cover 500 to each other, a position to which the adhesive 250 is applied may vary depending on shapes of the backlight unit 400 and the back cover 500. The adhesive 250 must be applied to a region where the backlight unit 400 and the back cover 500 come into contact with each other.

The adhesive 250 may be an acrylic-based, silicone-based, or urethane-based adhesive, but is not limited thereto. The adhesive 250 may be an adhesive in the form of a film.

Meanwhile, a curing method of the adhesive 250 may be UV curing, thermal curing, or natural curing. The curing method of the adhesive may vary depending on the type of the adhesive.

Then, coupling the back cover 500 thereto is performed. In this case, the back cover 500 may be coupled to the backlight unit 400 in a state in which the adhesive layer 250 is formed in a partial region. The adhesive layer 250 formed on a partial region of the back cover 500 increases a coupling force between the backlight unit 400 and the back cover 500.

Subsequent to coupling the back cover 500 to the backlight unit 400, curing the adhesive 250 to the backlight unit 400 is carried out. At this time, a third clamp may be provided at an edge of the back cover 500 such that the back cover 500 and the backlight unit 400 are strongly coupled to each other. The adhesive 250 is cured in a state in which the third clamp is provided.

As described above, in the present disclosure, a curved display is manufactured by physically bending a flat cover glass. For this reason, the present disclosure does not require a curved lamination process. Through this, the present disclosure may allow a curved display to be implemented while using an existing roll lamination facility for bonding a flat cover glass and a flat display as it is.

Hereinafter, a method of assembling the backlight unit and the back cover in a state in which the display assembly is physically bent will be described in more detail.

FIGS. 7 to 11 are conceptual views showing a method of assembling a backlight unit and a back cover in a state in which a display assembly is physically bent.

Figure 7:
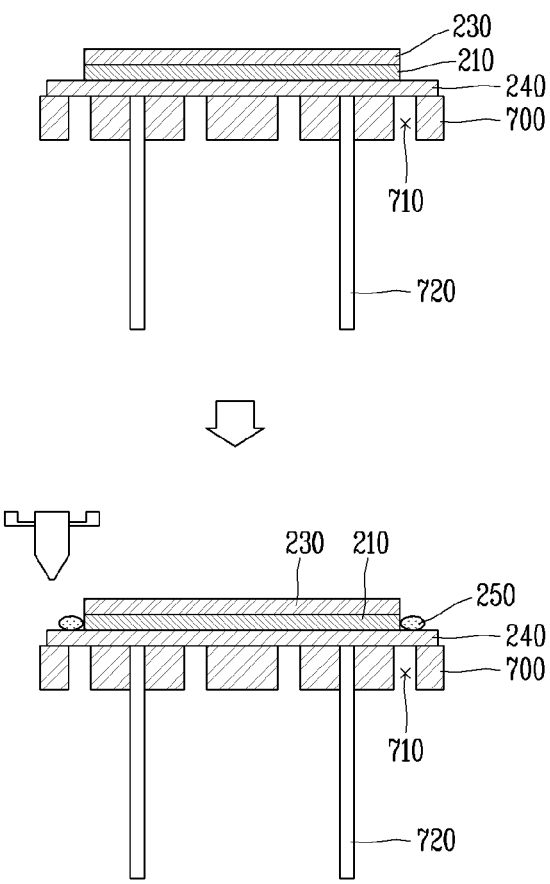
FIGS. 7 to 11 are conceptual views showing a method of assembling a backlight unit and a back cover in a state in which a display assembly is physically bent.

First, referring to FIG. 7, the flat display assembly 200 is put into a flat type loader unit. The display assembly 200 is loaded on a flat type chuck 700 by the lift pins 720. A plurality of holes 710 may be disposed in the flat chuck 700, and a vacuum may be formed through the holes 710 to fix the display assembly 200 to a surface of the chuck 700.

Meanwhile, holes are disposed in the flat chuck 700 to allow the lift pins 720 to move vertically and horizontally. The lift pins 720 may transfer the display assembly 200 onto the flat chuck 700 through the holes disposed in the flat chuck.

In a state in which the display assembly 200 is fixed on the flat chuck 700, the adhesive 250 is applied to an edge of the display assembly 200. Then, subsequent to releasing the vacuum formed in the flat chuck 700, the lift pins 720 ascend.

Figure 8:
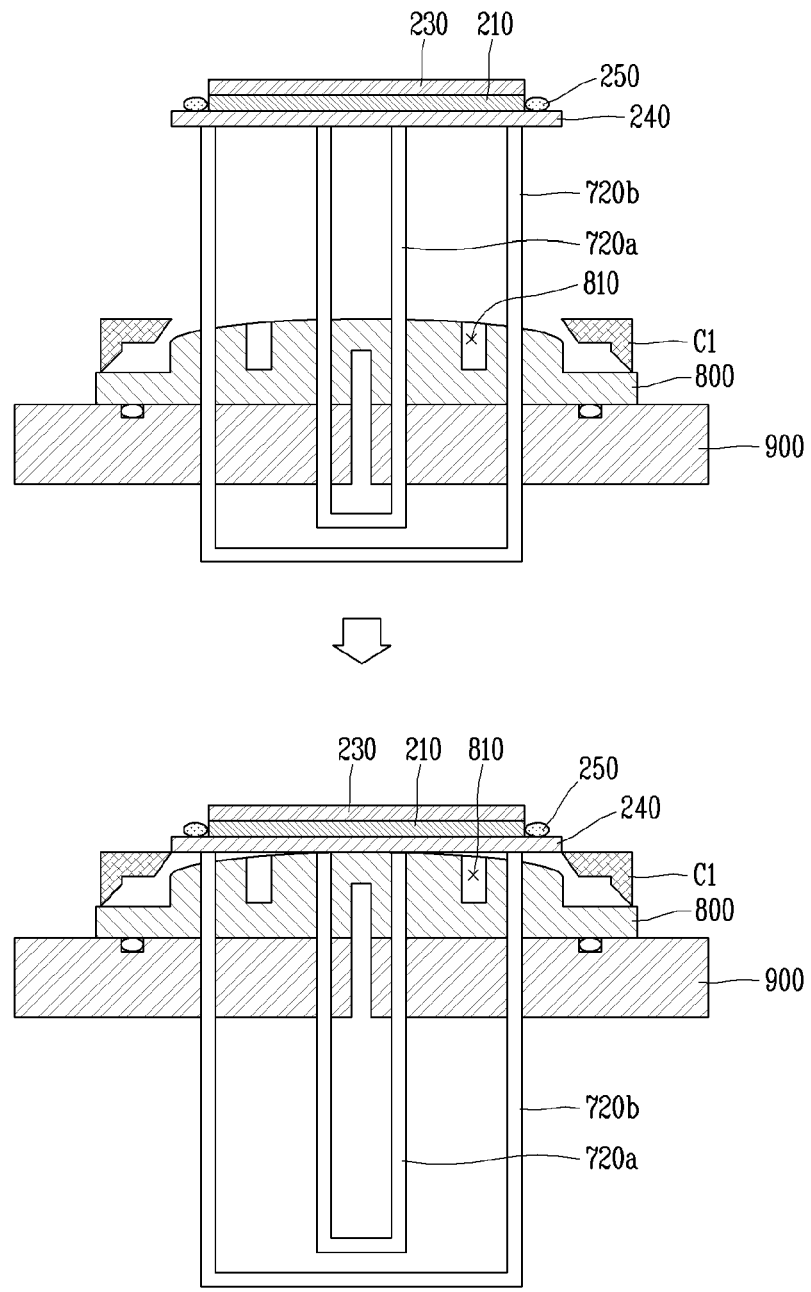

Then, referring to FIG. 8, the display assembly 200 is transferred to a curved jig 800. At this time, two types of lift pins 720a and 720b may be utilized. Specifically, the display assembly 200 is transferred onto the curved jig 800 by the first and second lift pins 720a and 720b. Here, the first lift pin 720a comes into contact with a central portion of the display assembly 200, and the second lift pin 720b comes into contact with an edge of the display assembly 200. Meanwhile, each of the first and second lift pins 720a and 720b may include a vacuum suction pad that is vacuum-sucked to the display assembly 200. A vacuum is formed in the vacuum suction pad to fix the display assembly 200 when the first and second lift pins 720a and 720b transfer the display assembly 200.

Holes are disposed in the curved jig 800 to allow the lift pins to move vertically and horizontally. The curved jig 800 is a frame for processing the display assembly 200 into a curved surface.

Subsequent to transferring the display assembly 200 onto the curved jig 800, the first and second lift pins 720a and 720b descend. Here, the first and second lift pins 720a and 720b descend until the display assembly 200 comes into contact with an uppermost portion of the curved jig 800.

Figure 9:
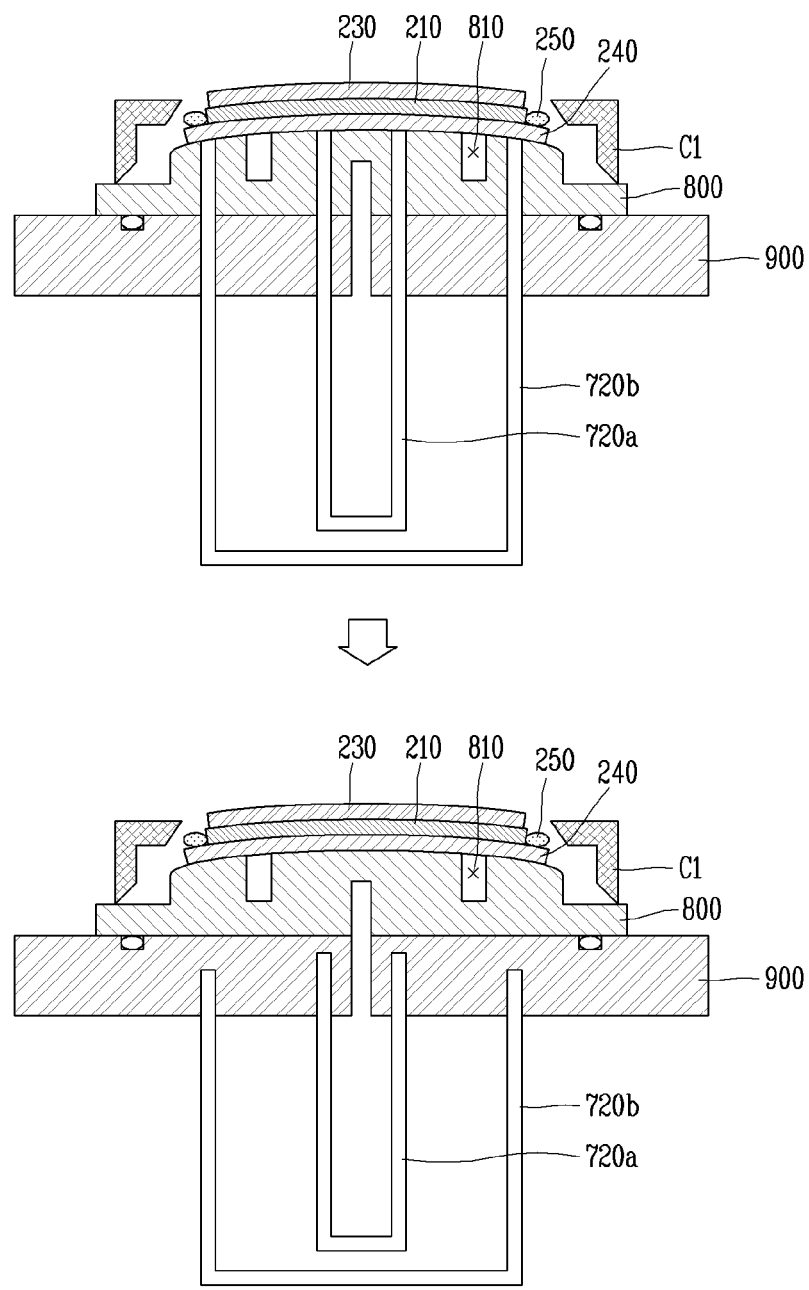

Then, referring to FIG. 9, when the display assembly 200 comes into contact with the uppermost portion of the curved jig 800, the first lift pin 720a stops descending, and a vacuum is formed through a vacuum hole 810 disposed in the curved jig 800. Accordingly, the display assembly 200 is bent. The second lift pin 720b descends together with the display assembly 200 according to a bending speed of the display assembly 200. At this time, the vacuum suction pad provided on the second lift pin 720b maintains a suction force, thereby providing an additional physical force to the display assembly 200. That is, in the present disclosure, the display assembly 200 is physically bent using a suction force formed by a curved jig 800 and a suction force formed by the second lift pin 720b.

When the display assembly 200 is completely bent, the first and second lift pins 720a and 720b descend to be completely separated from the display assembly 200. At this time, in order to prevent the display assembly 200 from being bent in reverse, the clamp C1 may be mounted at an edge of the display assembly 200.

Figure 10:
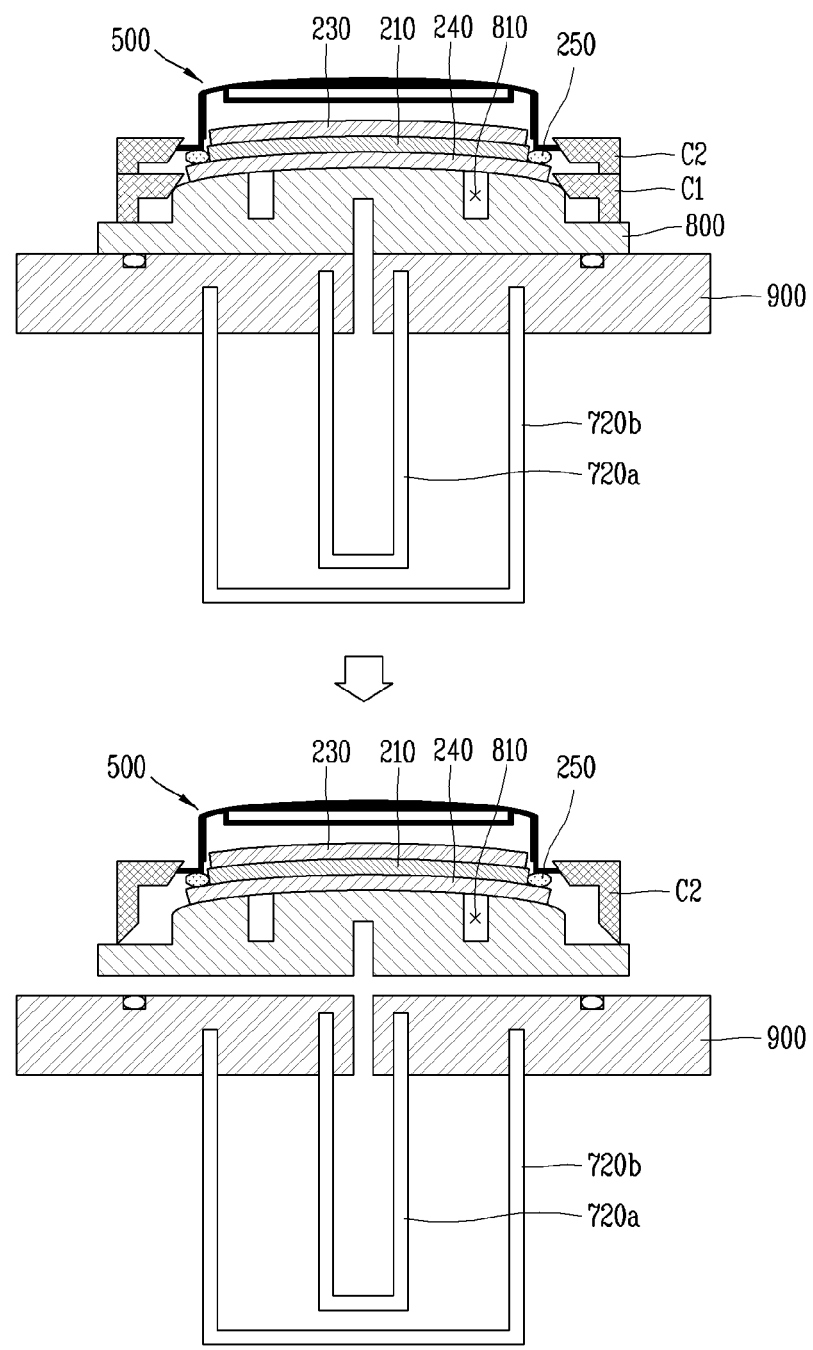

Then, referring to FIG. 10, the backlight unit 500 is coupled to a position to which the adhesive 250 is applied. Then, subsequent to mounting the clamp C2 such that the backlight unit 500 and the display assembly 200 are strongly coupled to each other, the adhesive 250 is cured.

Figure 11:
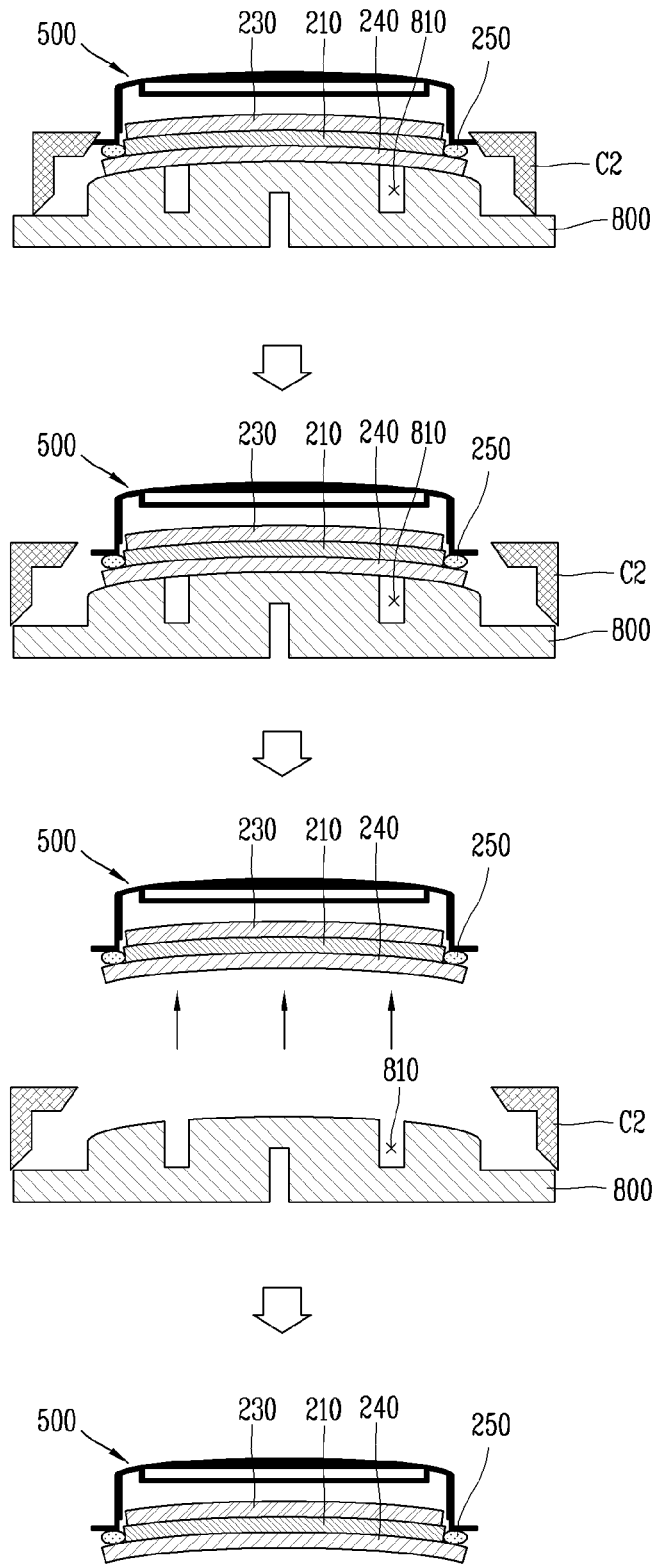

Then, referring to FIG. 11, the display assembly 200 on which the backlight unit 500 is mounted is separated from the curved jig 800. At this time, the clamps mounted on the display assembly 200 and the backlight unit 500, respectively, may be sequentially separated therefrom. The backlight unit 500 assists in maintaining the display assembly 200 in a bent state.

Figure 12:
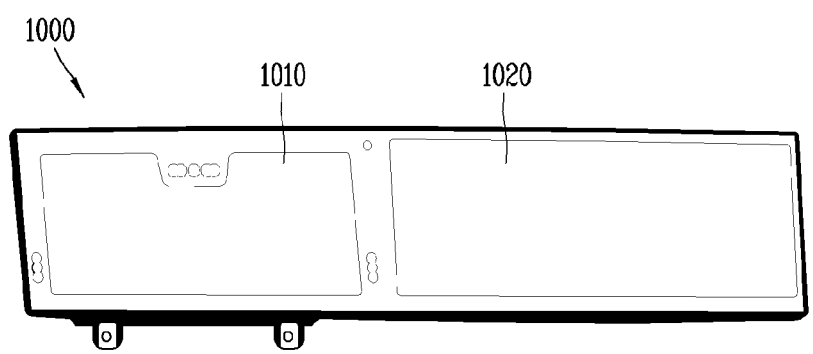
FIG. 12 is a conceptual view showing an instrument panel for a vehicle.

According to the foregoing method, a roll lamination process may be performed when a display and a cover glass are in a flat state, and thereby it is not required to design a lamination process for a curved surface. Accordingly, as shown in FIG. 12, a method for manufacturing a curved display device according to the present disclosure may be utilized for producing an instrument panel for a vehicle that requires display devices 1010 and 1020 having various curvatures.

In addition, according to the present disclosure, since a curved surface of a curved jig may be changed according to a curvature of a display assembly to be implemented, thereby maximizing the productivity and profitability of a curved display.

The invention claimed is:

1. A method of manufacturing a curved display device, the method comprising:
coupling a flat display, an optical clear adhesive, and a cover glass to manufacture a flat display assembly;
applying an adhesive to an edge of the flat display assembly;
seating the flat display assembly on a curved jig;
sucking the flat display assembly to a surface of the curved jig using a vacuum hole disposed in the curved jig such that the flat display assembly is bent; and
coupling a backlight unit to a region to which the adhesive is applied,
wherein the coupling of a backlight unit to a region to which the adhesive is applied comprises curing the adhesive while the backlight unit is pressed to the display assembly so as to maintain a bent state of the display assembly,
wherein:
the flat display assembly is seated on the curved jig through a first lift pin coming into contact with a central portion of the flat display assembly and a second lift pin coming into contact with an edge portion of the flat display assembly,
the seating of the flat display assembly on the curved jig comprises lowering the first and second pins until the display assembly comes into contact with an uppermost portion of the curved jig, and
the sucking the flat display assembly to a surface of the curved jig such that the flat display assembly is bent comprises:
stopping descent of the first lift pin when the display assembly comes into contact with the uppermost portion of the curved jig;
forming a vacuum through the vacuum hole disposed in the curved jig; and
descending together the second lift pin with the display assembly according to a bending speed of the display assembly.

2. The method of claim 1, wherein each of the first and second lift pins comprises a vacuum suction pad that is vacuum-sucked to the display assembly.

3. The method of claim 2, wherein the seating of the flat display assembly on a curved jig comprises:
seating the flat display assembly on first and second lift pins;
moving the first and second lift pins to the curved jig such that the flat display assembly and the curved jig overlap each other.

4. The method of claim 3, wherein the sucking of the flat display assembly to a surface of the curved jig is performed while maintaining a suction force of the vacuum suction pad provided in the second lift pin.

5. The method of claim 1, wherein the curved jig is provided with a plurality of vacuum holes, and
the sucking of the flat display assembly to a surface of the curved jig is performed by depressurizing an inside of the vacuum holes.

6. The method of claim 1, wherein the coupling of a backlight unit to a region to which the adhesive is applied comprises fixing the display assembly and the backlight unit with a clamp so as to maintain the display assembly in a bent state.

7. The method of claim 1, further comprising:
fixing the display assembly with a clamp to maintain the display assembly in a bent state after sucking the flat display assembly to a surface of the curved jig.

8. The method of claim 1, wherein the coupling of the flat display, the optical clear adhesive, and the cover glass to manufacture the flat display assembly is performed by roll lamination.

* * * * *